United States Patent [19]

Ballin

[11] 4,023,138
[45] May 10, 1977

[54] VEHICLE THEFT PREVENTION SYSTEM

[76] Inventor: Joseph Ballin, 19-50 48th St., Astoria, N.Y. 11105

[22] Filed: Nov. 17, 1975

[21] Appl. No.: 632,706

[52] U.S. Cl. .............................. 340/64; 340/224; 340/280; 343/225; 180/114

[51] Int. Cl.$^2$ ..................................... B60R 25/04

[58] Field of Search ............... 340/63, 64, 65, 224, 340/276, 280; 343/225, 228; 325/364; 180/114

[56] References Cited
UNITED STATES PATENTS 3,157,871  11/1964  Umanoff ............................ 340/280

Primary Examiner—Alvin H. Waring
Attorney, Agent, or Firm—Hopgood, Calimafde, Kalil, Blaustein & Lieberman

[57] ABSTRACT

A vehicle theft prevention system includes a receiver located in the vehicle for receiving a signal from a remote transmitter. When the distance between the receiver and transmitter exceeds a predetermined amount, such that the signal strength at the receiver is less than a predetermined signal level, a control circuit is actuated which upon actuation may actuate an alarm, deactuate the vehicle ignition system so as to prevent further operation of the vehicle, or both.

6 Claims, 2 Drawing Figures

VEHICLE THEFT PREVENTION SYSTEM

The present invention relates to an improved system for preventing the theft of vehicles and for providing an alarm upon the occurrence of an attempted theft of a vehicle.

The theft and unauthorized use of vehicles has long been a serious concern to owners of vehicles. In addition to the theft of automobiles, the hijacking of trucks and the theft of trucks from their garages and rental cars from their parking areas produce substantial and increasing losses each year.

It is an object of the invention to provide an efficient, reliable and inexpensive system which actuates an alarm upon the occurrence of a theft and also may deactuate the vehicle ignition system to prevent further operation of the vehicle by the would-be thief.

In the system of the invention, a receiver is located in the vehicle and is tuned to receive a signal from a remote transmitter. When the distance between the receiver and transmitter exceeds a predetermined amount, such that the signal strength at the receiver is less than a predetermined signal level, a control circuit is actuated which upon actuation may actuate an alarm, deactuate the vehicle ignition system so as to prevent further operation of the vehicle, or both.

Figure 1:
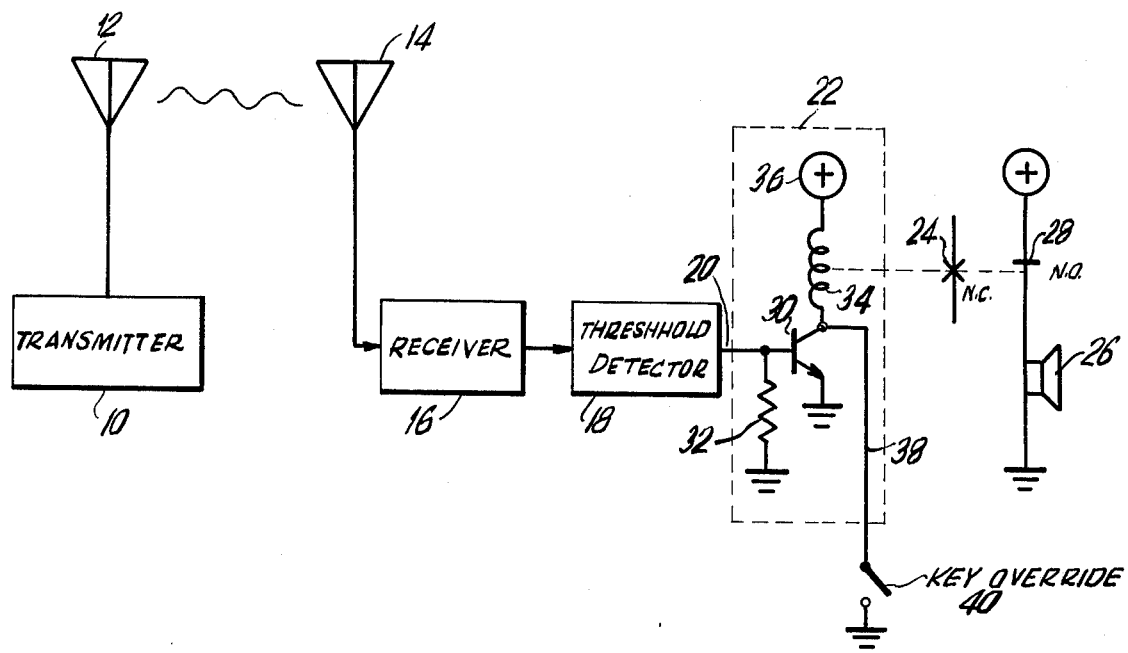
Figure 2:
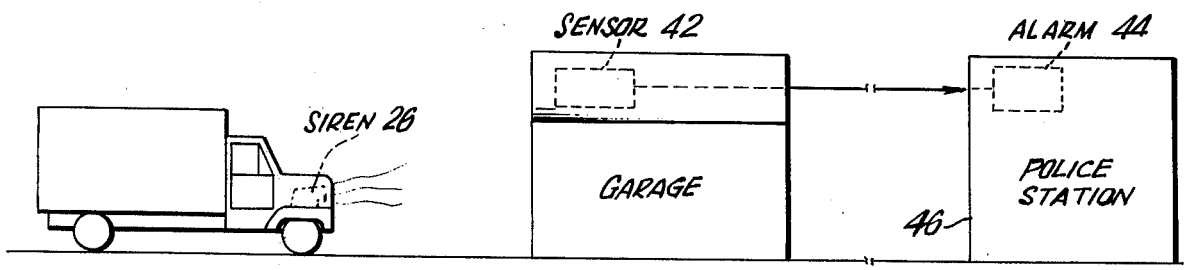

To the accomplishment of the above and to such further objects as may hereinafter appear, the invention relates to a vehicle theft prevention system substantially as defined in the appended claims and as described in the following specification taken in conjunction with the accompanying drawing in which:

FIG. 1 is a schematic diagram partly in block form of a theft prevention system according to one embodiment of the invention; and FIG. 2 is a schematic diagram in block form of one application of the theft prevention system of the invention.

As shown in the FIG. 1, the vehicle theft prevention system of the invention comprises a transmitter 10 which includes a transmitting antenna 12. The transmitter 10 may either be held by the authorized driver of the vehicle or it may be maintained in a fixed location such as a garage or car rental office.

A receiver, which is located in the vehicle, preferably at a location that is not apparent to an unauthorized user of the vehicle, includes a receiving antenna 14 coupled to a receiver 16 tuned to the frequency of transmitter 10. The amplitude of the signal received by receiver 16 is, as is known, inversely proportional to the square of the distance between antennas 12 and 14, and is directly proportional to the amplitude of the transmitted signal. That is, as the antennas 12 and 14 are moved farther apart, the amplitude of the received signal at receiver 16 decreases.

The receiver 16 is connected to a threshold detector 18 which detects the amplitude of the received signal which may be at either an rf, if, or audio frequency. The threshold detector 18, which may be a Schmitt trigger of conventional design, is known to those skilled in the art and thus requires no further description herein. The threshold detector 18 is effective to produce a control signal on a line 20 whenever the amplitude of the receiver output signal falls below a predetermined level, corresponding to the distance between the transmitter and receiver exceeding a predetermined amount.

The control signal is, in turn, applied to a control unit 22, described in greater detail below, which upon the presence of the control signal, performs one or both of the following functions: It deactuates the vehicle ignition system as shown schematically by opening the normally closed ignition contacts 24, and activates an alarm 26 by closing the normally-open alarm contacts 28.

It will thus be understood that when the distance between the receiver antenna carried by the vehicle and the transmitter exceeds a predetermined distance, such that the signal received at the receiver and detected at threshold detector 18 is below a predetermined value, the vehicle ignition is deactuated preventing its further operation, and/or an alarm is sounded.

As shown in the embodiment of the invention herein specifically described, the control circuit may include a transistor 30 having a base terminal connected to line 20 and receiving the control signal thereon when it is produced by detector 18. A resistor 32 is connected between the base of the transistor and ground and the emitter is connected directly to ground. The collector of the transistor 30 is connected through a relay energizing coil 34 to a voltage source 36.

In operation, when a control signal is present on line 20 as a result of the receiver having been separated from the transmitter by the predetermined distance, such as by 100 yards or so, transistor 30, which may be, as shown, normally in the "off" or nonconductive condition, is rendered "on" or conductive so that current is caused to flow in the collector circuit of the transistor through relay coil 34 to energize the latter. The energization of coil 34 in this manner can either open ignition contacts 24 or close alarm contacts 28, or both, to either deactuate the vehicle and/or actuate the alarm as described above or activate the horn and flasher.

If it is desired to be able to override the theft prevention system, the collector of transistor 30 may be connected to ground by a line 38 so that the relay coil is deenergized by the operation of a switch 40, which may be advantageously key operated. In this manner, the control unit is either maintained or returned to its normal or nonconductive condition upon the operation of the key. Thus, when an authorized driver of the vehicle removes the vehicle from a garage, for example, at which the transmitter is located and travels farther than the predetermined distance to produce a control or alarm signal, the driver, simply by operating switch 40 by the use of a special key, may override the system and continue to operate the vehicle without interruption of the ignition system or the sounding of an alarm.

It will thus be appreciated that the system of the present invention effectively prevents the unauthorized removal of a vehicle beyond a predetermined distance from the location of a transmitter. The transmitter may be held on the person of the authorized driver when he leaves his vehicle such as at a diner or motel parking lot, such that the subsequent removal of the vehicle from its parking place will actuate the theft prevention system. Alternatively, the transmitter may be located in a garage, such as for trucks or taxis, or at a car rental agency where the vehicle is parked when not on the road. In this case, should the vehicle be removed from the garage or rental agency by a thief, the vehicle would travel only a short distance before the alarm was activated and the ignition disabled.

If desired, and as shown in FIG. 2, a sensor 42 may be provided in the garage which is responsive to the activation of the alarm 26. The sensor 42 may be connected to a remote control alarm system 44 located in a central station 46, such as a police station or a private security office. When the alarm 26 is actuated as described above, the sensor 42 is actuated to send a signal to the alarm 44 at the central station 46, thereby to inform the authorities there that a vehicle has been stolen from the garage. When the vehicle is removed from the garage by an authorized driver, all that he need do is actuate the override switch 40 so that the theft prevention system is disabled.

It is to be understood that the vehicle alarm system of the invention may be used with any type of vehicle other than trucks and automobiles, such as golf carts, motorcycles, motors scooters, and snowmobiles. Moreover, although the system has been herein specifically described with respect to one embodiment thereof, it will be understood that modifications may be made therein, such as in the design of the control circuit, all without necessarily departing from the spirit and scope of the invention. For example, as will be recognized by those skilled in the art, the transmitter and receiver may each be coded (for example, by pulse code modulation signals) to assure individual control of vehicles.

What is claimed is:

1. A vehicle theft prevention system comprising a receiver adapted to receive a signal from a transmitter located remotely therefrom, means coupled to said receiver for producing a control signal when the signal received at said receiver from the transmitter is below a predetermined level corresponding to the distance between the transmitter and receiver exceeding a predetermined amount, switch means connected to said control signal producing means and operated between a first condition to a second condition by said control signal, and theft inhibiting means including means for disabling the vehicle ignition system operatively connected to said switch means and actuated upon the operation of said switch means.

2. The theft prevention system of claim 1, further comprising means for actuating said disabling means when said switch means is in said second condition.

3. The theft prevention system of claim 1, in which said theft inhibiting means further includes an alarm, and means for actuating said alarm when said switch means is in said second condition.

4. The theft prevention system of claim 1, further comprising means operatively connected to said switch means for overriding the actuation of said switch means by said control signal, thereby to maintain said switch means in said first condition irrespective of whether or not a control signal is applied to said control unit.

5. The theft prevention system of claim 4, in which said theft inhibiting means comprises an alarm means and means for disabling the vehicle ignition system.

6. The theft prevention system of claim 1, in which said ignition disabling actuating means comprises a contact means operated between a first condition when said relay is not energized and a second condition to actuate said disabling means when said relay coil is energized.

* * * * *